United States Patent
Reid, Jr. et al.

[11] Patent Number: 5,810,406
[45] Date of Patent: Sep. 22, 1998

[54] MOLDING WITH IMPROVED FOAM ATTACHMENT LAYER

[75] Inventors: James Sims Reid, Jr., Cleveland Heights, Ohio; Douglas Neil Malm, Northville, Mich.

[73] Assignee: The Standard Products Company, Cleveland, Ohio

[21] Appl. No.: 611,486

[22] Filed: Mar. 5, 1996

[51] Int. Cl.⁶ .................................................. B60R 13/04
[52] U.S. Cl. ........................... 293/128; 293/120; 428/31; 52/716.5
[58] Field of Search ...................... 293/128, 126, 293/120, 155; 296/207; 428/31; 52/716.5, 718.01, 717.04, 717.05

[56] References Cited

U.S. PATENT DOCUMENTS

| | | |
|---|---|---|
| Re. 32,819 | 1/1989 | Waugh . |
| 3,606,432 | 9/1971 | Honatzis ................................. 293/128 |
| 3,606,433 | 9/1971 | Kunevicius .......................... 293/120 X |
| 3,843,475 | 10/1974 | Kent ................................... 293/128 X |
| 4,246,303 | 1/1981 | Townsend ........................... 293/128 X |
| 4,277,526 | 7/1981 | Jackson .............................. 293/128 X |
| 4,386,799 | 6/1983 | Molnar ................................... 293/120 |
| 4,446,179 | 5/1984 | Waugh . |
| 4,671,551 | 6/1987 | Walsh et al. ........................ 293/128 X |
| 4,911,959 | 3/1990 | Miyakawa . |
| 4,973,371 | 11/1990 | Parker . |
| 5,058,843 | 10/1991 | Koster . |
| 5,123,688 | 6/1992 | Takado et al. .......................... 293/120 |
| 5,149,569 | 9/1992 | McCue ............................... 293/128 X |
| 5,265,925 | 11/1993 | Cox et al. .............................. 293/120 |

FOREIGN PATENT DOCUMENTS

| | | | |
|---|---|---|---|
| 192772 | 12/1956 | Austria ................................. 293/128 |
| 1505257 | 6/1969 | Germany ............................... 293/120 |

*Primary Examiner*—Joseph D. Pape
*Attorney, Agent, or Firm*—Harness, Dickey & Pierce, P.L.C.

[57] ABSTRACT

The present invention relates to moldings such as trim strips and, more particularly, to moldings comprising an outer layer and an inner layer which are bonded together mechanically by a plurality of mating lugs and recesses disposed along the interface of the two layers. Ideally, the materials utilized for the first and second layers will be sufficiently compatible such that adhesive bonding will also be accomplished between the layers, without generally requiring a separate adhesive be disposed therebetween. Various methods for manufacturing the moldings in accordance with the teachings of the present invention are also disclosed.

6 Claims, 1 Drawing Sheet

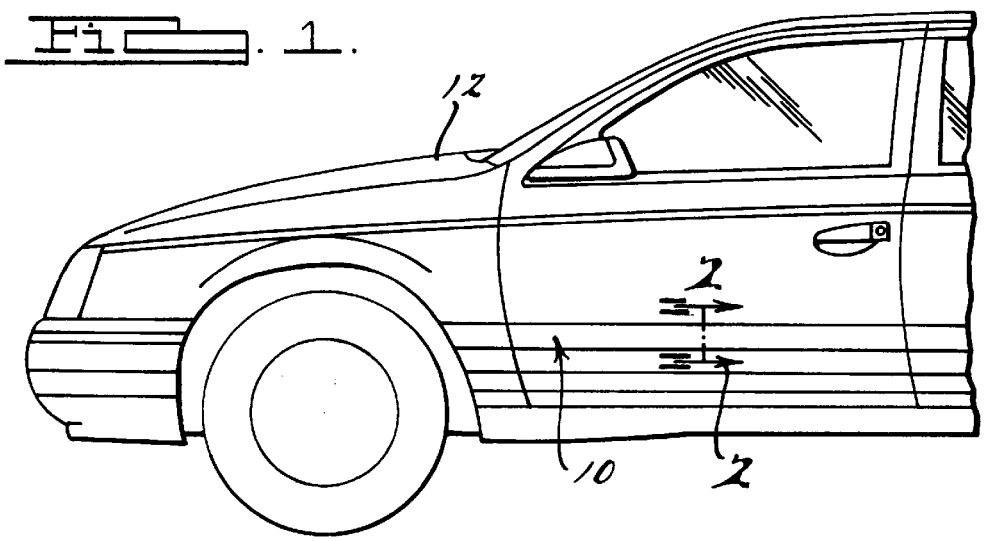
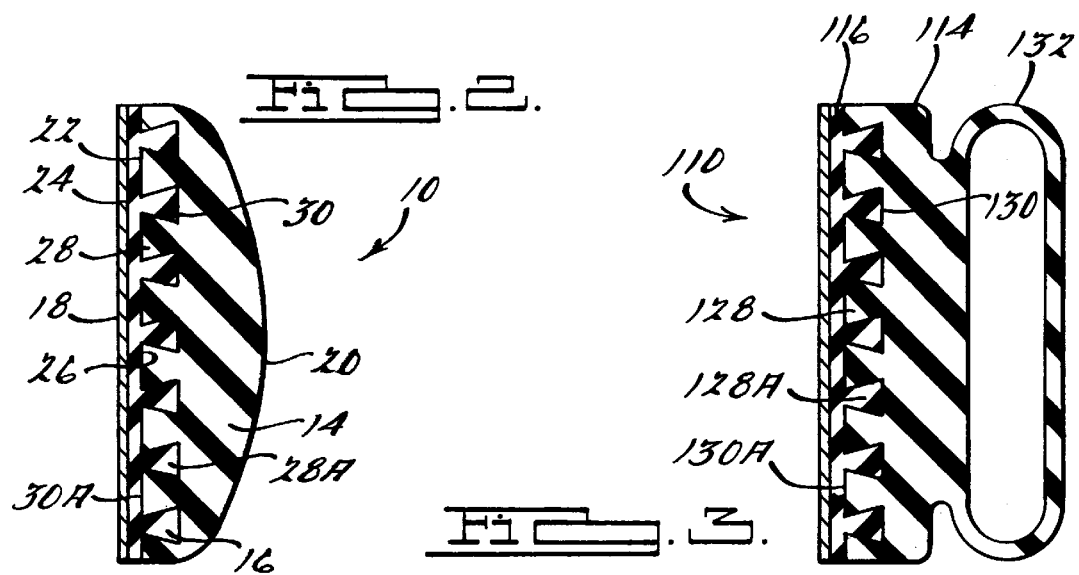
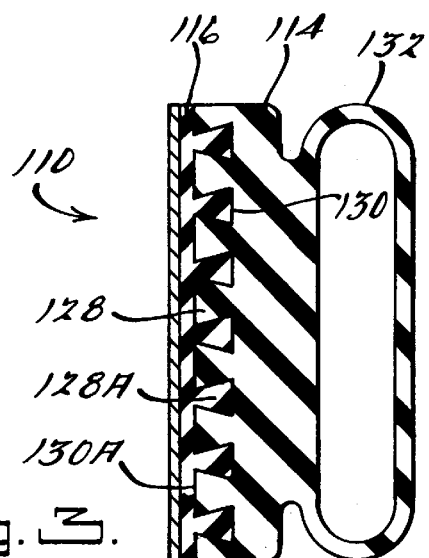
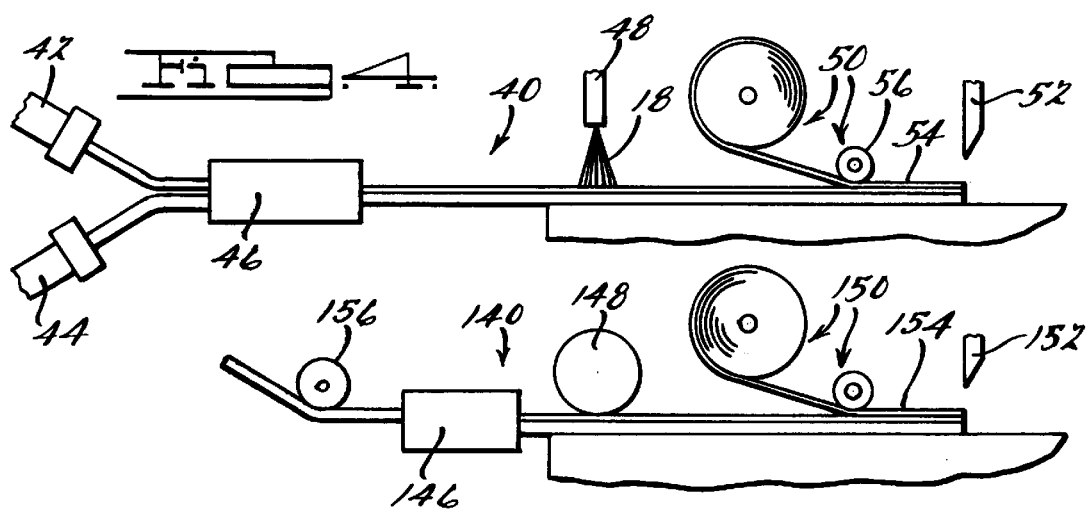

MOLDING WITH IMPROVED FOAM ATTACHMENT LAYER

BACKGROUND OF THE INVENTION

The present invention relates to moldings such as trim strips and the like and their methods of manufacture. More specifically, it relates to moldings such as trim strips manufactured by co-extruding an outer decorative layer of thermoplastic or rubber and an inner backing layer of a foamed material together such that a strong attachment between the layers is accomplished.

Commonly known trim strips generally require the use of additives and, more particularly, adhesives to facilitate bonding between the decorative layers and the backing layer or layers. This requires applying an additive or adhesive during the manufacturing process. Such application adds extra material and complexity to the manufacturing process.

Also, commonly known trim strips utilize a tape backing which is applied to the trim strip after formation to facilitate bonding between various layers or to facilitate attachment of the trim strips to the desired substrate such as an automotive vehicle, for example. Using tape adds extra material and complexity to the manufacturing process. The bonding properties of tape are frequently diminished when it is exposed to heat, which is often necessary to obtain a desired shape or configuration in a trim strip.

A problem which has been common with regard to trim strips including an outer decorative layer and an inner backing layer of foam formed by extrusion is that a significant amount of material is often wasted. For example, when foam is continuously fed in a trim strip manufacturing process, excess foam must generally be cut away and discarded in order for the material of the decorative covering layer to seal around the inner layer of foam to create a finished trim strip.

Yet, another problem with both injection molded and extruded trim strips, especially when it has been attempted to reduce or eliminate the use of adhesives between layers, is that of delamination or separation between the layers.

SUMMARY OF THE INVENTION

The present invention attempts to solve one or more of the aforementioned problems by providing the art with a trim strip which is manufactured by co-extruding a decorative outer layer and an inner backing layer, together such that the two layers are bonded together mechanically. Further, the two layers may additionally be adhesively bonded together as a result of the temperature at which the co-extrusion is carried out. Thereafter, as the co-extruded trim strip exits the extruder, a layer of adhesive is applied to the layer of foam along a side opposite that which is bonded to the decorative outer layer. Once the adhesive is applied to the foam, a liner is applied over the adhesive to preserve the adhesive prior to applying the trim strip to the desired substrate.

To enhance bonding between the decorative cover layer and the backing layer, the present invention also preferably utilizes heat to facilitate an adhesive type of bond between the layers. Ideally, the materials utilized for the decorative cover layer and the inner backing layer will be chemically compatible. Thus, the need for adhesives between the layers, which generally add cost, complexity, and mess to the process, is avoided. Heat-bonding causes the components to form a molecular-level tie. It does not rely on an adhesive, which is separate from the components being joined. Therefore, the possibility for bond failure is minimized by this process. Heat-bonding not only creates an extremely strong linkage between the components, but also facilitates shaping of the trim strip, without sacrificing bonding properties.

The inner layer of foam can be co-extruded onto the trim strip which eliminates the process of tape extrusion. Further, since the adhesive is applied in line directly to the foam under certain embodiments, the current method of producing trim strips with an improved foam attachment layer eliminates the separate steps of: (1) extruding or calendering the foam sheet; (2) the application of adhesive to the foam sheet; and (3) the slitting of sheet to foam widths. Additionally, the shipping of tape and inventories are eliminated or greatly reduced.

Still another advantage of the methods of the present invention is the achievement of a liner removal tab without an extra operation and with simple straight line cutters.

BRIEF DESCRIPTION OF THE DRAWINGS

FIG. 1 is a side elevation view of a trim strip in accordance with the present invention applied to an automotive vehicle;

FIG. 2 is a sectional view of the trim strip of FIG. 1 through line 2—2 thereof;

FIG. 3 is a sectional view of an alternative trim strip embodiment in accordance with the teachings of the present invention;

FIG. 4 is a schematic view of an apparatus for manufacturing trim strips in accordance with the teachings of the present invention; and FIG. 5 is a schematic view of an apparatus for manufacturing trim strips in accordance with the teachings of the present invention under an alternative method.

DETAILED DESCRIPTION OF THE PREFERRED EMBODIMENT

Referring to FIG. 1, a molding in the form of a trim strip 10 in accordance with the teachings of the present invention is shown as being attached to an automotive vehicle 12. While the trim strips of the present invention are contemplated as being particularly useful for application to automotive vehicles, still other uses are contemplated as will be described below.

As illustrated in FIG. 2, the trim strip 10 generally comprises an outer layer 14, an inner layer 16 and optionally, but preferably, an adhesive layer 18. The outer layer 14 includes a first or outer surface 20 which is generally exposed to the atmosphere and a second or inner surface 22 which is bonded to the inner layer 16. The outer surface 20 is often decorative in nature to provide the trim strip with a measure of aesthetic appeal and is typically comprised of a relatively hard thermoplastic or rubber based material.

The inner layer 16 includes a first surface 24 to which the adhesive layer 18 is optionally applied, and a second surface 26 which is bonded to the second surface 22 of the outer layer 14. The inner layer 16 which generally serves as a backing layer is formed from a foamed material which is typically more pliable than the material of the outer layer.

An important aspect of the present invention relates to the manner in which the first and second layers 14 and 16, respectively, are brought together to form the trim strip proper. The second surface 22 of the outer layer 14 is provided with a plurality of alternating lugs 28 and recesses 30 to assist in mechanically attaching the first and second layers together. The second surface 26 of the second layer 16 is likewise provided with a plurality of lugs 28A and recesses 30A which mate with the corresponding lugs and recesses provided along the second surface of first layer as shown in FIG. 2 to mechanically bond the first and second layers together.

While the respective lug and recess portions of the first and second layers are shown to have a mortise shape in cross-section, it should be understood by those skilled in the art that various lug and recess embodiments capable of providing means for accomplishing a mechanical lock between the inner and outer layers are contemplated. For example and without limitation, the lugs and recesses may have a ball and socket geometry.

Referring to FIG. 3, an alternative trim strip embodiment in accordance with the teachings of the present invention is illustrated. As with the trim strip of FIG. 2, the trim strip 110 includes a first or outer layer 114 and a second or inner layer 116, wherein the first and second layers are bonded together mechanically by a plurality of mating lug and recess portions 128, 130 and 128A, 130A disposed along mating surfaces 122 and 126 of the first and second layers, respectively.

Essentially, the only structural difference between the trim strip embodiments shown in FIGS. 2 and 3 relates to the compressible bulb 132 provided on first layer of the trim strip embodiment of FIG. 3. Thus, whereas the trim strip 10 illustrated in FIG. 2 may be particularly useful for applications such as automobile body panel attachments, the trim strip 110 as illustrated in FIG. 3 may be employed as a refrigerator or other such door panel seal where the seal is accomplished by compression of the bulb provided on the outer layer of the trim strip.

Referring to FIG. 4, a schematic view of an apparatus 40 for carrying out one method of manufacturing a trim strip in accordance with the teachings of the present invention is provided. The apparatus 40 includes a first extruder 42, a second extruder 44, a die head 46, an adhesive applicator 48, a protective film applicator 50 and a cutting apparatus 52. In order to manufacture a trim strip in accordance with the teachings of the present invention, a thermoplastic or extrudable rubber based material is fed to the die head 46 by a first extruder 42 and an extrudable foamed material is fed to the die head 46 by a second extruder 44. The die head port (not shown) is shaped such that the materials comprising the first and second layers are formed with interlocking lug and recess portions as previously described to bond the respective layers together mechanically as the materials are brought together at elevated temperatures at the die head. Further, the materials utilized for the first and second layers will also preferably be chemically compatible such that at least surface bonds are formed along the interface between the two layers to adhesively connect the first and second layers together.

Upon extruding the first and second layers together, an adhesive material designated by reference numeral 18 is applied along the first surface of the backing layer and a protective film 54 is thereafter optionally applied over the adhesive by the protective film applicator. The protective film applicator 50 may under certain circumstances serve the additional function of compressing the first and second layers together via the roller shown at reference numeral 56. Once the first and second layers have been brought together, the adhesive has been applied and the protective film optionally disposed over the adhesive, segments of the trim strip can be provided by cutting the trim strip to the desired length utilizing the cutting apparatus 52. Thereafter, the formed trim strip can be applied directly to the desired substrate or stored for subsequent application to a substrate.

Referring to FIG. 5, still another apparatus 140 for carrying out a method of manufacturing trim strips in accordance with the teachings of the present invention is shown in a schematic view. According to a second method of manufacturing a trim strip, either the first or second layer is preformed to include a surface having a plurality of lugs and recesses over which the other of said first or second layers is applied by extruding the material through the die head 146. The preformed layer is fed by the roller 156 between the first and second layers to the die head for application of the material to be extruded to accomplish the above described mechanical bonding.

Upon joining the first and second layers together, an adhesive is applied using a roller 148 and a layer of protective film 154 is applied over the adhesive via the protective film applicator 150. Again, after applying the protective film, the trim strip formed utilizing the apparatus 140 can be cut to desired lengths by cycling the cutting apparatus 152.

The invention has been described in an illustrative manner, and it is to be understood that the terminology which has been used is intended to describe the invention in a non-limiting manner. The invention as described therefore constitutes the preferred embodiments of the present invention, and it should be appreciated that the invention is susceptible to modification, variation and change without departing from the proper scope and fair meaning of the accompanying claims.

What is claimed is:

1. A molding comprising:

a first layer including a surface having a plurality of lugs and recesses;

a second layer extruded in association with said first layer generally forming an adhesive bond between said layers, said second layer including a surface having a plurality of lugs and recesses which mate with the corresponding lugs and recesses provided on said first layer to also form a mechanical attachment between said first and second layers, said mechanical attachment being sufficient to resist undesired detachment between said first and second layers in the event that said adhesive bond becomes weakened over time; and means for attaching said molding to a substrate.

2. The molding of claim 1, wherein said means for attaching said molding to a substrate is an adhesive disposed along said second layer.

3. The molding of claim 1, wherein said first layer includes a compressible bulb.

4. The molding of claim 1, wherein said first layer is formed from a material selected from the group consisting of thermoplastics and rubber based materials.

5. The molding of claim 4, wherein the material utilized to form the first layer is extrudable.

6. The molding of claim 1, wherein said second layer is formed from a foamed material.

* * * * *